United States Patent
Veldsman (10) Patent No.: US 11,263,296 B2
(45) Date of Patent: Mar. 1, 2022

(54) SECURE 3D PRINTING

(71) Applicant: WIPPIT LTD., London (GB)

(72) Inventor: Barrett Veldsman, London (GB)

(73) Assignee: WIPPIT LTD., Bromley (GB)

( * ) Notice: Subject to any disclaimer, the term of this patent is extended or adjusted under 35 U.S.C. 154(b) by 0 days.

(21) Appl. No.: 17/244,826

(22) Filed: Apr. 29, 2021

(65) Prior Publication Data

US 2021/0279347 A1   Sep. 9, 2021

Related U.S. Application Data (63) Continuation of application No. 16/976,022, filed as application No. PCT/GB2019/050410 on Feb. 15, 2019.

(30) Foreign Application Priority Data

Feb. 28, 2018  (GB) ..................................... 1803311

(51) Int. Cl.
*G06Q 20/00*   (2012.01)
*G06F 21/14*   (2013.01)
(Continued)

(52) U.S. Cl.
CPC ............ *G06F 21/14* (2013.01); *B29C 64/393* (2017.08); *B33Y 30/00* (2014.12); *B33Y 50/02* (2014.12);
(Continued)

(58) Field of Classification Search
CPC ................... G06F 21/608; G06F 21/14; G06F 2221/2143; G06Q 30/0641;
(Continued)

(56) References Cited

U.S. PATENT DOCUMENTS

| 2013/0235412 A1 | 9/2013 | Baldwin et al. |
| 2014/0156053 A1 | 6/2014 | Mahdavi et al. |

(Continued)

FOREIGN PATENT DOCUMENTS

| EP | 1 975 784 A1 | 10/2008 |
| WO | WO 02/10962 A1 | 2/2002 |
| WO | WO 2017/133594 A1 | 8/2017 |

OTHER PUBLICATIONS

Canadian Examination Report issued for Application No. 3,091,874, dated May 25, 2021, and received by the Applicant Jun. 7, 2021.
(Continued)

*Primary Examiner* — Dante Ravetti
(74) *Attorney, Agent, or Firm* — Cooley LLP (57) ABSTRACT

A computer-implemented method for controlling reproduction of an item represented by a digital asset stored in a trusted computing environment using a reproduction device in an untrusted computing environment, in which a succession of data seg¬ments is transmitted from the trusted computing environment to the untrusted computing environment, the succession of data segments comprising segments of reproduction data, each of which includes at least one instruction for controlling the reproduction device to reproduce a portion of the item, and at least one segment of obfuscation data which has a structure identical the reproduction data but is incapable of controlling the reproduction device to reproduce a portion of the item, the method comprising: a) determining whether the next segment of data in the succession should be a segment of reproduction data or a segment of obfuscation data; b) where the next segment of data should be a segment of reproduction data, selecting and extracting an unprocessed segment of data from the digital asset to form the next segment of data; c) where the next segment of data should be a segment of obfuscation data, providing a segment of obfuscation data to form the (Continued)

next segment of data; d) generating a unique encryption key and encrypting the next segment of data using the unique encryption key; e) transmitting the encrypted next segment of data from the trusted computing environment; f) decrypting the encrypted next segment of data received at the untrusted computing environment; g) attempting to control the reproduction device using the decrypted data segment such that where the next segment of data is reproduction data, the reproduction device reproduces the portion of the item at the untrusted computing environment in accordance with the instructions included with the data segment, and where the next segment of data is obfuscation data, the reproduction device is unresponsive; and h) iterating steps (a) to (g) until the entire digital asset, or a desired portion of it, has been processed.

16 Claims, 3 Drawing Sheets

(51) Int. Cl.
| | | |
|---|---|---|
| *B33Y 30/00* | (2015.01) | |
| *B33Y 50/02* | (2015.01) | |
| *B29C 64/393* | (2017.01) | |
| *G06F 21/60* | (2013.01) | |
| *G05B 19/4099* | (2006.01) | |
| *G06Q 30/06* | (2012.01) | |

(52) U.S. Cl.
CPC ....... *G05B 19/4099* (2013.01); *G06F 21/608* (2013.01); *G06Q 30/0641* (2013.01); *G05B 2219/35533* (2013.01); *G05B 2219/36542* (2013.01); *G06F 2221/0755* (2013.01); *G06F 2221/2143* (2013.01)

(58) Field of Classification Search
CPC ...... G05B 19/4099; G05B 2219/36542; G05B 2219/35533; B33Y 50/02
USPC .......................... 705/16, 21, 59; 380/44, 262
See application file for complete search history.

(56) References Cited

U.S. PATENT DOCUMENTS

| | | |
|---|---|---|
| 2015/0253761 A1 | 9/2015 | Nelson et al. |
| 2015/0310219 A1 | 10/2015 | Haager et al. |
| 2019/0230113 A1* | 7/2019 | Al Faruque ............. G06F 21/10 |

OTHER PUBLICATIONS

International Search Report issued for International Application No. PCT/GB2019/050410 dated Apr. 5, 2019.
International Preliminary Report on Patentability issued for International Application No. PCT/GB2019/050410 dated Sep. 1, 2020.
GB Search Report issued for Application No. GB1803311.8, dated Aug. 7, 2018.
GB Examination Report issued for Application No. GB 1803311.8, dated Dec. 3, 2019.

* cited by examiner

SECURE 3D PRINTING

This application is a continuation of Ser. No. 16/976,022, filed Aug. 26, 2020, entitled "Secure 3D Printing", which is a U.S. National Stage Entry of and is entitled to and hereby claims priority under 35 U.S.C. §§ 365 and 371 to PCT Application No. PCT/GB2019/050410, having an international filing date of Feb. 15, 2019, and entitled "Method for Controlling Reproduction of an Item", which in turn claims priority to G.B. Patent Application No.: 1803311.8, filed Feb. 28, 2018, entitled the same. The disclosures of the above applications are incorporated herein by reference in their entireties.

FIELD OF THE INVENTION

This invention relates to a computer-implemented method for control ling reproduction of an item represented by a digital asset stored in a trusted computing environment using a reproduction device in an untrusted computing environment. The invention also relates to a system configured to perform the steps of the method, and to a computer-readable medium containing instructions for carrying out the method.

BACKGROUND

Some reproduction devices allow users to reproduce objects by additive methods. For example, 3D printers use additive techniques to reproduce three-dimensional objects. Other reproduction devices allow users to reproduce objects by subtractive methods. For example, a lathe or mil ling machine removes material to reproduce an object. Users of such reproduction devices range from individual hobbyists reproducing a few objects a year to large industrial producers reproducing many objects every day. Users can design a digital representation of an object using a software package on a computer, or from a photograph, and transform it into a design file comprising a set of instructions for reproducing an object with a reproduction device. These design files can be shared freely between users, such that one user can design a model and other users can reproduce the resulting object as many times as they like. An advantage of 3D printing is that it is relatively quick and cheap to create 3D objects.

The free sharing of a design file comprising a set of instructions to reproduce an object may be desirable for a hobbyist who has created a model that they would like to share with friends.

However, it is recognized in the art that for other users, such as industrial producers, this free sharing may represent a threat to their intel lectual property and/or business model. It is advantageous for industrial producers to be able to sell or license a design file comprising a set of instructions for a 3D printer, for example, to a single user and to control whether that user can share the design file with others. Alternatively, the industrial producer may wish to control whether a user can print more than one copy of the 3D object from the design file. This may be desirable, for instance, as it allows the industrial producer to protect their intellectual property.

Systems for sharing encrypted design files exist in the art. In these known systems, a design file is shared with a user and is decrypted in order to allow a 3D printer to print an item. However, a user can easily share the design file once it has been decrypted and can reproduce the item as many times as he wishes even if the original owner of the design file would not permit this. This means that the owner of the intellectual property loses control of how the design file is used. Further, there is an inherent weakness in this known system. As the entire design file is encrypted, if the encryption system is compromised (for example, a leaked cryptographic key), then control of the entire design file is lost.

U.S. Pat. No. 9,604,406 discloses printing a 3D article from a 3D design file describing a 3D design, wherein a computer processor receives the design file in an encrypted format.

SUMMARY

In a first aspect of the invention, there is provided a computer-implemented method for controlling reproduction of an item represented by a digital asset stored in a trusted computing environment using a reproduction device in an untrusted computing environment, in which a succession of data segments is transmitted from the trusted computing environment to the untrusted computing environment, the succession of data segments comprising segments of reproduction data, each of which includes at least one instruction for controlling the reproduction device to reproduce a portion of the item, and at least one segment of obfuscation data which has a structure identical to the reproduction data but is incapable of controlling the reproduction device to reproduce a portion of the item, the method comprising: a) determining whether the next segment of data in the succession should be a segment of reproduction data or a segment of obfuscation data; b) where the next segment of data should be a segment of reproduction data, selecting and extracting an unprocessed segment of data from the digital asset to form the next segment of data; c) where the next segment of data should be a segment of obfuscation data, providing a segment of obfuscation data to form the next segment of data; d) generating a unique encryption key and encrypting the next segment of data using the unique encryption key; e) transmitting the encrypted next segment of data from the trusted computing environment; f) decrypting the encrypted next segment of data received at the untrusted computing environment; g) attempting to control the reproduction device using the decrypted segment such that where the next segment of data is reproduction data, the reproduction device reproduces the portion of the item at the untrusted computing environment in accordance with the instructions included with the data segment, and where the next segment of data is obfuscation data, the reproduction device is unresponsive; and h) iterating steps (a) to (g) until the entire digital asset, or a desired portion of it, has been processed.

It is desirable to have a system that securely delivers a digital asset to a user for instructing a 3D printer to enable reproduction of an item represented by a digital asset. By implementing a method in accordance with the present invention, as defined above, an owner of a digital asset can keep control of the digital asset, as the end user can reproduce an item represented by the digital asset, but cannot share the digital asset and cannot make any copies of the item. The problems mentioned above are therefore overcome.

The determination of whether the next segment of data should be reproduction data or obfuscation data can be done in accordance with a set of rules, for example alternating between reproduction data segments and obfuscation data segments, producing a set number of obfuscation data segments for transmission in between each reproduction data segment (for example, two, three, four, five, ten, twenty, a hundred obfuscation data segments) or producing a random number of obfuscation data segments for transmission in between each reproduction data segment.

In some embodiments, the method makes use of dynamic encryption, wherein not only the encryption keys, but the configuration of the cryptography system changes with each iteration. Alternatively, the configuration of the cryptography system may change with a subset of iterations (such as 2, 10, 100, 1000 or 10,000 iterations). The number of the subset of iterations may be based on the size of the object to be reproduced as a segment in an object comprising few segments may be more valuable than a segment in an object comprising many segments. In other embodiments, the method makes use of an encryption key based on a number unique to the reproduction device or other hardware at the untrusted computing environment (e.g. generating an encryption key based on a serial number, a MAC number or a hash of the hardware configuration of the reproduction device or other hardware at the untrusted computing environment).

A segment may comprise the instructions for assembling a single layer of an object. Alternatively a segment may comprise the instructions for assembling a single part of an object, for example a third of a layer. In other embodiments, a segment may comprise instructions for assembling multiple layers. Alternatively, a segment may comprise instructions for assembling a part of an object comprising multiple layers, for example the "arm" of a "star" or a segment of a sphere.

The reproduction device can be a 3D printer.

In some embodiments, the reproduction device may be one or more of: a stereolithographic printer, a digital light processing printer, a fused deposition modelling printer, a selective laser sintering printer, a selective laser melting printer, an electronic beam melting printer, a laminated object manufacturing printer, a binder jetting printer or a material jetting printer. In other embodiments, the reproduction device may be a lathe or other machine tool. In some embodiments, the reproduction device may be a device used for 2D reproduction processes, such as printing a photo or cutting out a stencil. In yet other embodiments, the reproduction device may be any device that performs additive processes or subtractive processes to reproduce an item.

The digital asset can be a file containing 2D data instructions in a numerical control programming language such as G-code, PNG, SVG or any intermediary form.

Step (g) can include verifying completion of the reproduction of the portion of the item without error.

The data decrypted in step (f) can be stored in protected memory at the untrusted computing environment.

The data stored in protected memory can be erased after step (e) has been completed.

An advantage of storing the instructions in protected memory is that it makes it more difficult or impossible for an unauthorised user to copy the segment of data of the digital asset that is being reproduced. By erasing the instructions from the protected memory after step (e) has been completed, a full copy of the file is never stored in the untrusted computing environment, again making unauthorised access to the entire digital more difficult or impossible.

In some embodiments, the segments of data from the digital asset are selected in a sequential manner, such that the reproduction device prints a first layer of an object and the instructions for printing the first layer are erased before the reproduction device receives instructions for printing a second layer. In this way, the reproduction device only ever stores the instructions for a single layer, making unauthorised extraction of the whole digital asset more difficult than if the whole digital asset was transmitted at once. If the method for control ling reproduction of an item is used in combination with dynamic encryption, then the encryption for each layer or each subset of layers would need to be compromised in order for the entire digital asset to be extracted.

Step (e) can comprise transmitting the encrypted segment of data from the trusted computing environment directly to the untrusted computing environment, the encrypted data received at the untrusted computing environment in step (f) being the encrypted segment of data.

Step (e) can comprise transmitting the encrypted segment of data from the trusted computing environment to a stream management server for onward transmission by the stream management server to the untrusted computing environment.

An unresponsive reproduction device is a reproduction device that does not make an additional layer when the obfuscation data is received. In some embodiments, being unresponsive also includes not moving a part of the reproduction device used for reproducing an item (for example, a print head) when the obfuscation data is received by the reproduction device, in this way when the next segment of reproduction data is received the reproduction device can continue from where the last segment of reproduction data finished. An unresponsive reproduction device may communicate an error message, or flash a light or lights when the obfuscation data is received; however, the reproduction device will remain responsive to future reproduction data segments. If a pre-populated data base is used, the obfuscation data may be pre-tested with reproduction devices in order to ensure that the reproduction device does not amend the item being reproduced, move a part of the reproduction device used for reproducing an item and/or stop responding to a subsequent segment of received reproduction data. Likewise if a set of rules is used to generate obfuscation data, the rules may be pre-tested with reproduction devices in order to ensure that the reproduction device does not amend the item being reproduced, move a part of the reproduction device used for reproducing an item and/or stop responding to a subsequent segment of received reproduction data.

The pre-populated database may comprise obfuscation data that has been generated in accordance with a set of rules. The pre-populated data base may be updated remotely, so that the size of the database can be minimised. The obfuscation data may comprise instructions for a reproduction device manufactured by a first manufacturer and is used when a user is using a reproduction device manufactured by a second manufacture, so that the device does not respond. The obfuscation data may also comprise empty or null instructions that have been pre-tested and are unused by a reproduction device manufacturer, so that the reproduction device does not respond. The obfuscation data may comprise instructions that contain header data or metadata for a reproduction device manufactured by a first manufacturer may be automatically discarded by a reproduction device manufactured by a second manufacturer.

The unique encryption key can be generated by the stream management server and transmitted to a digital asset storage server on which the digital asset is stored in the trusted computing environment. In other embodiments, the unique encryption key can be generated in the trusted computing environment, for example on the digital asset storage server.

In one embodiment, the next segment of reproduction data selected in step (a) is contiguous with already-processed segments of data in the digital asset, when iterating steps (a) to (g).

In another embodiment, the location of the segment of reproduction data selected in step (a) and the location of the next segment of data selected in step (a) within the digital asset are random, when iterating steps (a) to (g).

An advantage of providing a segment of obfuscation data, as described in step (c), is that because the obfuscation data does not include instructions for controlling the reproduction device, it provides an extra layer of security. An adversary who has gained access to the data would have to work out which data includes instructions for controlling the reproduction device the digital asset and which data does not, thereby providing an extra layer of protection. It is likely that any adversary would gain access to the data when it is transmitted from the untrusted computing environment (for example a user's device, such as a PC) to the reproduction device, as the data can be unencrypted at this final stage. Even though the data is unencrypted, an adversary still has to work out which data is relevant to the object being reproduced.

In one embodiment, providing the obfuscation data in step (c) comprises extracting the data from a pre-populated database. In another embodiment, providing the obfuscation data in step (c) comprises generating the data according to a set of rules. The obfuscation data may be generated in real-time. The obfuscation data may be provided or the rules for generating the obfuscation data may be such that the obfuscation data does not cause an error at the reproduction device, does not cause the reproduction device to edit or change the object being made or does not cause a part of the reproduction device, such as a print head, to move, so that when the next piece of reproduction data is transmitted to the reproduction device, the instructions can naturally follow from the previously transmitted piece of reproduction data.

In some embodiments, the obfuscation data is simply discarded or ignored by the reproduction device at step (f) as the reproduction device cannot interpret the obfuscation data. In some embodiments, this is achieved by providing obfuscation data that comprises metadata or header data that is directed towards a different make or model of reproduction device than the metadata or header data of the reproduction data.

In other embodiments, the obfuscation data may comprise data that is known to cause the reproduction device not to respond. The print quality of the object is unaffected by the introduction of obfuscation data, as it does not cause the printer to respond in manner that causes the object to be edited in a manner other than intended by the instructions sent as reproduction data.

The method can further comprise translating a source data structure in a first format into the digital asset.

For example, in some embodiments, an STL file (or any other file type suitable for use with reproduction devices, such as 3D printers) is converted into a G-code file (or any other file type suitable for use with reproduction devices, such as 3D printers).

The source data structure may be, for example, an Additive Manufacturing File (AMF) file and/or a Stereolithography (STL) file. Thus, the first format may be AMF or STL. In other embodiments, first format may be any one or more of the following file formats: .stl, .obj, .fbx, .collada, .3 ds, .iges, .step, .vrml/.x3d, or .3mf. In other embodiments, the source data structure in the first format may have been generated from a file describing an object such as one or more of the following file types: 3D Studio Max (.max, 0.3ds), AC3D (.ac), Apple 3DMF (.3dm/.3dmf), Autocad (.dwg), Blender (.blend), Caligari Object (.cob), Collada (.dae), Dassault (.3dxml), DEC object file Format (.off), DirectX 3D Model (.x), Drawing Interchange Format (.dxf), DXF Extensible 3D (.x3d), Form-Z (.fmz), GameExchange2-Mirai (.gof), Google Earth (.kml/.kmz), HOOPS HSF (.hsf), Lightwave (.lwo/.lws), Lightwave Motion (.mot), MicroStation (.dgn), Nendo (.ndo), OBJ (.obj), Okino Transfer File Format (.bdf), OpenFlight (.fit), Openinventor (.iv), Pro Engineer (.sip), Radiosity (.radio), Raw Faces (.raw), RenderWare Object (.rwx), Revit (.rvt), Sketchup (.skp), Softimage XSI (.xsi), Stanford PLY (.ply), STEP (.stp), Stereo Litography (.stl), Strata StudioPro (.vis), TrueSpace (.cob), trueSpace (.cob, .sen), Universal (.u3d), VectorWorks (.mcd), VideoScape (.obj), Viewpoint (.vet), VRML (.wrl), Wavefront (.obj), Wings 3D (.wings), X3D Extensible 3D (.x3d), or Xfig Export (.fig).

The method can comprise extracting the obfuscation data from a pre-populated database, such that the obfuscation data does not cause the reproduction device to stop responding or to alter the object contrary to the instructions transmitted in the reproduction data.

The method can comprise generating the obfuscation data in accordance with a set of rules, such that the obfuscation data does not cause the reproduction device to stop responding or to alter the object contrary to the instructions transmitted in the reproduction data.

The method can be initiated by selection and/or purchase of the item from an online source.

In some embodiments, the online source is one or more of: a computer network, a mobile network, a social network, an e-commerce marketplace, any other online community, a user choosing an item from an online catalogue.

In some embodiments, firmware may be provided on the reproduction device, such that the data segment is decrypted at the reproduction device. An advantage of such an arrangement is that the data may be encrypted right up to the point that it is received by the reproduction device and the decryption of the data may take place on the reproduction device rather than on the user's device. This provides an additional layer of security as an adversary cannot inspect the data that is transferred between the user's device and the reproduction device.

The present invention may also relate to a system comprising at least one processor, each of which is coupled to a respective memory, the or each memory containing instructions which, when executed on the or each processor, cause the or each processor to perform the steps of the method of the first aspect of the invention.

The present invention may also relate to a computer-readable medium containing instructions for execution on at least one processor, the instructions causing the or each processor, when executed, to perform the steps of the method of the first aspect of the invention.

In a second aspect of the invention, there is provided a computer-implemented method for controlling access to an item represented by a digital asset stored in a trusted computing environment to enable the item to be reproduced by a reproduction device in an untrusted computing environment, in which a succession of data segments is transmitted from the trusted computing environment to the untrusted computing environment, the succession of data segments comprising segments of reproduction data, each of which includes at least one instruction for controlling the reproduction device to reproduce a portion of the item, and at least one segment of obfuscation data which has a structure identical to the reproduction data but is incapable of controlling the reproduction device to reproduce a portion of the item, the method comprising: a) determining whether the next segment of data in the succession should be a segment of reproduction data or a segment of obfuscation data; b) where the next segment of data should be a segment of reproduction data, selecting and extracting an unprocessed segment of data from the digital asset to form the next segment of data; c) where the next segment should be a segment of obfuscation data, providing a segment of obfuscation data to form the next segment of data; d) encrypting the next segment of data using a unique encryption key; e) transmitting the encrypted next segment of data from the trusted computing environment; f) iterating steps (a) to (e) until the entire digital asset, or a desired portion of it, has been processed.

The reproduction device may be a 3D printer.

The digital asset may be a file containing 2D data instructions in a numerical control programming language such as G-code, PNG, SVG or any intermediary form.

The method can comprise extracting the obfuscation data from a pre-populated database.

The method can comprise generating the obfuscation data in accordance with a set of rules.

The unique encryption key may be generated by a stream management server and transmitted to a digital asset storage server on which the digital asset is stored in the trusted computing environment. In other embodiments, the unique encryption key can be generated in the trusted computing environment, for example on the digital asset storage server.

The next segment of reproduction data selected in step (a) may be contiguous with already-processed segments of data in the digital asset, when iterating steps (a) to (e). Alternatively, the location of the segment of reproduction data selected in step (a) and the location of the next segment of reproduction data selected in step (a) within the digital asset may be random, when iterating steps (a) to (e).

The method may further comprise translating a source data structure in a first format into the digital asset.

The present invention may also relate to a system comprising at least one processor, each of which is coupled to a respective memory, the or each memory containing instructions which, when executed on the or each processor, cause the or each processor to perform the steps of the method of the second aspect of the invention.

The present invention may also relate to a computer-readable medium containing instructions for execution on at least one processor, the instructions causing the or each processor, when executed, to perform the steps of the method of the second aspect of the invention.

In accordance with a third aspect of the invention, there is provided a computer-implemented method for reproducing an item represented by a digital asset stored in a trusted computing environment using a reproduction device in an untrusted computing environment, in which a succession of data segments is transmitted from the trusted computing environment to the untrusted computing environment, the succession of data segments comprising segments of reproduction data, each of which includes at least one instruction for control ling the reproduction device to reproduce a portion of the item, and at least one segment of obfuscation data which has a structure identical to the reproduction data but is incapable of control ling the reproduction device to reproduce a portion of the item, the method comprising: a) receiving an encrypted segment of reproduction data having been extracted from the digital asset or obfuscation data; b) decrypting the encrypted segment of data received at the untrusted computing environment; c) control ling the reproduction device using the decrypted data segment such that where the segment of data is reproduction data, the reproduction device reproduces the portion of the item at the untrusted computing environment in accordance with the instructions included with the data segment, and where the segment of data is obfuscation data, the reproduction device is unresponsive; and d) iterating steps (a) to (c) until the entire digital asset, or a desired portion of it, has been reproduced.

The segment of data may be extracted from the digital asset by a digital asset storage server on which the digital asset is stored in the trusted computing environment.

The reproduction device may be a 3D printer.

The digital asset may be a file containing 2D data instructions in a numerical control programming language such as G-code, PNG, SVG or any intermediary form. The obfuscation data may be provided by extracting the obfuscation data from a pre-populated database or may be provided by generating the obfuscation data in accordance with a set of rules.

Step (c) may include verifying completion of the reproduction of the portion of the item without error.

The instructions recovered in step (c) may be stored in protected memory at the untrusted computing environment. The instructions stored in protected memory may be erased after step (c) has been completed.

An unresponsive reproduction device is a reproduction device that does not make an additional layer when the obfuscation data is received. In some embodiments, being unresponsive also includes not moving a part of the reproduction device used for reproducing an item (for example, a print head) when the obfuscation data is received by the reproduction device, in this way when the next segment of reproduction data is received the reproduction device can continue from where the last segment of reproduction data finished. An unresponsive reproduction device may communicate an error message, or flash a light or lights when the obfuscation data is received; however, the reproduction device will remain responsive to future reproduction data segments. If a pre-populated database is used, the obfuscation data may be pre-tested with reproduction devices in order to ensure that the reproduction device does not amend the item being reproduced, move a part of the reproduction device used for reproducing an item and/or stop responding to a subsequent segment of received reproduction data. Likewise if a set of rules is used to generate obfuscation data, the rules may be pre-tested with reproduction devices in order to ensure that the reproduction device does not amend the item being reproduced, move a part of the reproduction device used for reproducing an item and/or stop responding to a subsequent segment of received reproduction data.

The decryption of the encrypted segment of data may be carried out using a key generated by a stream management server.

In some embodiments, firmware may be provided on the reproduction device, such that the data segment is decrypted at the reproduction device. An advantage of such an arrangement is that the data may be encrypted right up to the point that it is received by the reproduction device and the decryption of the data may take place on the reproduction device rather than on the user's device. This provides an additional layer of security as an adversary cannot inspect the data that is transferred between the users device and the reproduction device.

The present invention may also relate to a system comprising at least one processor, each of which is coupled to a respective memory, the or each memory containing instructions which, when executed on the or each processor, cause the or each processor to perform the steps of the method of the third aspect of the invention.

The present invention may also relate to a computer-readable medium containing instructions for execution on at least one processor, the instructions causing the or each processor, when executed, to perform the steps of the method of the third aspect of the invention.

In accordance with a fourth aspect of the invention, there is provided a computer-implemented method for management of a process for control ling reproduction of an item represented by a digital asset stored in a trusted computing environment using a reproduction device in an untrusted computing environment, in which a succession of data segments is transmitted from the trusted computing environment to the untrusted computing environment, the succession of data segments comprising segments of reproduction data, each of which includes at least one instruction for controlling the reproduction device to reproduce a portion of the item, and at least one segment of obfuscation data which has a structure identical to the reproduction data but is incapable of controlling the reproduction device to reproduce a portion of the item, the method comprising: a) generating a unique encryption key and sending the unique encryption key to the trusted computing environment for use in encrypting a segment of reproduction data or obfuscation data, wherein the reproduction data is selected and extracted from the digital asset; b) generating a unique decryption key corresponding to the unique encryption key and sending the unique decryption key to the untrusted computing environment; and c) iterating steps (a) and (b) until the entire digital asset, or a desired portion of it, has been processed.

The reproduction device may be a 3D printer.

The digital asset may be a file containing 2D data instructions in a numerical control programming language such as G-code, PNG, SVG or any intermediary form.

The obfuscation data may be extracted from a pre-populated database or generated in accordance with a set of rules.

The method may further comprise receiving the encrypted segment of data from the trusted computing environment and transmitting it to the untrusted computing environment.

The present invention may also relate to a system comprising at least one processor, each of which is coupled to a respective memory, the or each memory containing instructions which, when executed on the or each processor, cause the or each processor to perform the steps of the method of the fourth aspect of the invention.

The present invention may also relate to a computer-readable medium containing instructions for execution on at least one processor, the instructions causing the or each processor, when executed, to perform the steps of the method of the fourth aspect of the invention.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Figure 1:
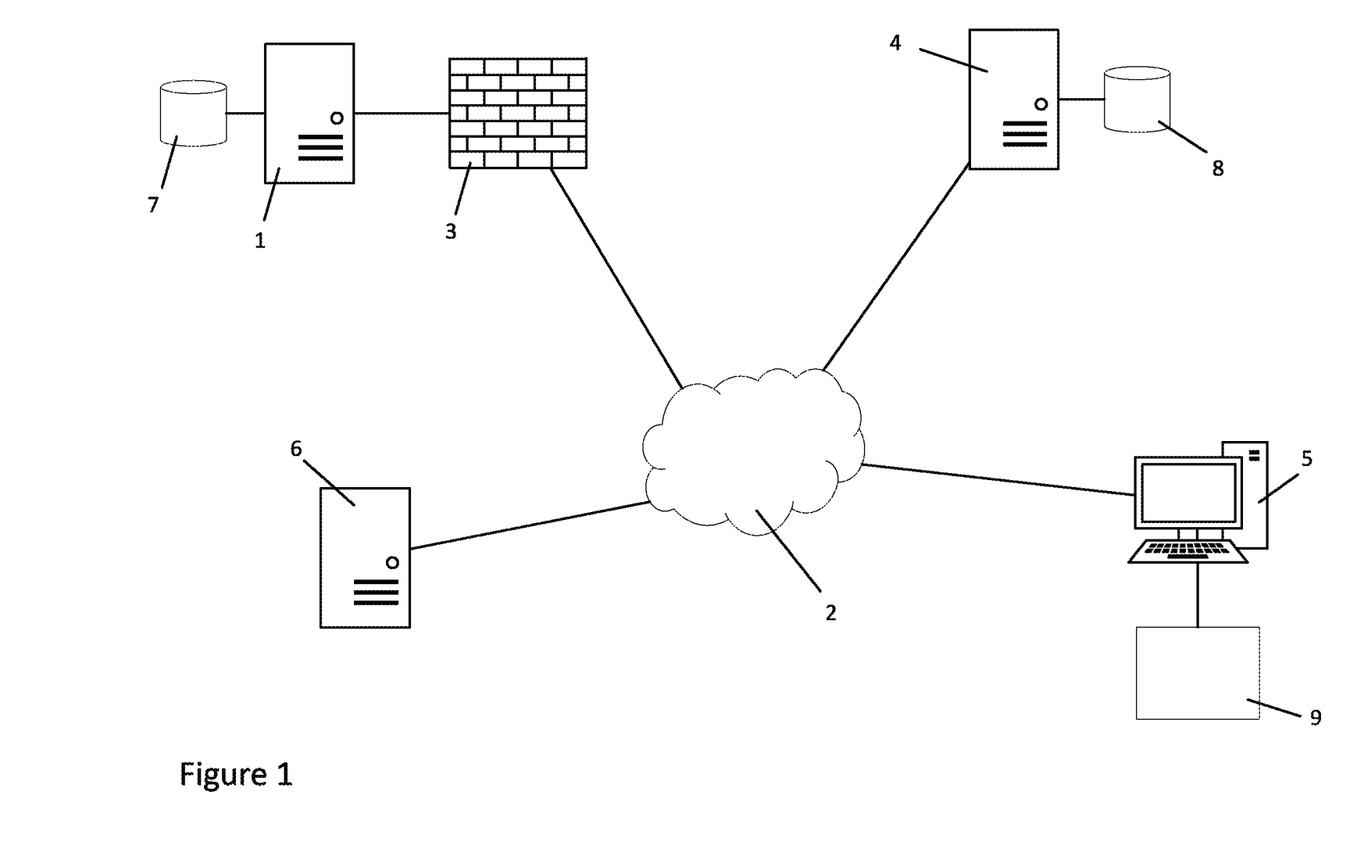
FIG. 1 is a schematic view of a system for controlling reproduction of items by way of a method according to the invention.

A computer system suitable for implementing the invention is shown in FIG. 1. This includes a digital asset storage server 1 coupled to the Internet 2 via a firewall 3. Also coupled to the Internet 2 are a stream management server 4, a personal computer 5 belonging to an end user of the system, and an e-commerce server 6. The digital asset storage server 1 is also coupled to a digital asset storage space 7, and the stream management server 4 is coupled to a stream management database 8. The personal computer 5 is coupled to a 3D printer 9.

Together, the servers and other hardware depicted in FIG. 1 enable a manufacturer or other owner of intellectual property in a digital asset to allow third parties to reproduce an item represented by the digital asset only in permitted quantities and without the third party being able to store and/or redistribute the digital asset. Thus, the manufacturer or owner of the intellectual property in the digital asset retains control of the reproduction of an item represented by the digital asset whilst enabling reproduction to be carried out remotely by third parties.

The digital asset storage server 1 and digital asset storage space 7 are situated within a trusted computing environment. They are connected to the Internet 2 via a firewall 3 to prevent unpermitted, third party access to data within the trusted computing environment. The owner of intel lectual property in digital assets stored on the digital asset storage space 7 can trust that no unpermitted copying of digital assets or transfer of digital assets beyond the firewall 3 can occur; the trusted computing environment is defined thus from the viewpoint of the owner of the intellectual property in the digital assets. The personal computer 5 is within the untrusted computing environment. Although the digital asset storage server 1 may be hosted in a cloud computing environment (such as Amazon Web Services ECC, or Microsoft Azure, for example), many users (i.e. the owners of the intellectual property in the digital assets) will prefer to retain physical control of the server in their own premises for utmost security.

The stream management server 4 is provided by a supplier of a service for implementing the method of the invention. Its functionality will be explained below. It may be hosted in a cloud computing environment (such as Amazon Web Services ECC, or Microsoft Azure, for example).

The e-commerce server 6 will typically be provided by another party than the owners of the intellectual property in digital assets and the supplier of stream management server 4. Its purpose is to enable end users to view items available for reproduction using the method described herein, to enable the purchase of the rights to reproduce the items and to take payment for such purchases over the Internet 2.

The personal computer 5 is just a conventional personal computer owned by an end user. It may be a desktop computer (as shown) or a tablet or mobile phone or any other computing device capable of accessing the Internet 2 and communicating with the 3D printer 9.

Although not shown in FIG. 1, the stream management server 4, personal computer 5 and e-commerce server 6 will typically be connected to the Internet via respective firewalls. The firewall 13 is specifically depicted to help illustrate the extent of the trusted computing environment.

The example shown in FIG. 1 makes use of a 3D printer to reproduce items represented by a digital asset stored on the digital asset storage space 7 connected to digital asset storage server 1. As will be apparent from the discussion above, the invention may be used with other types of reproduction device. For example, the digital asset(s) could be digital photographs owned by a photographer, and the reproduction device could be a printer.

Another possibility is where the digital asset is a 3D computer model of a spare part (such as a spare part for a car or domestic appliance, for example) and the reproduction device could be a CNC machine tool, such as a mill or lathe. In this case, the reproduction facility would usually be in a commercial or industrial facility rather than a domestic environment.

The process by which the system depicted in FIG. 1 enables remote reproduction of an item represented by a digital asset only to the extent permitted by the owner of the intellectual property in the digital asset and/or item will now be described with reference to FIGS. 2 and 3.

Figure 3:
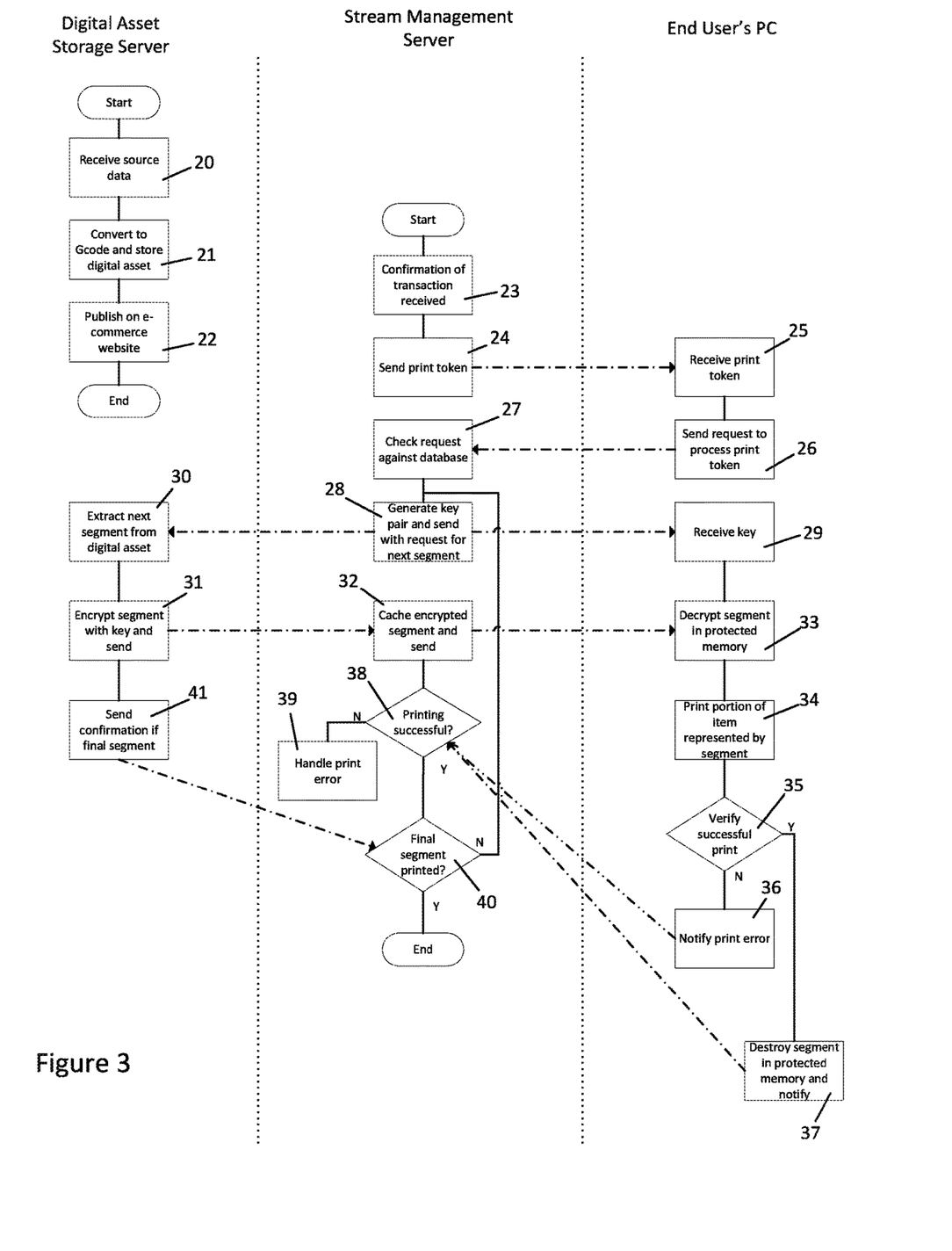
FIG. 3 explains the process in terms of a flowchart.

In FIG. 3, the processes carried out on each of the digital asset storage server 1, stream management server 4 and end user's personal computer 5 are shown alongside each other so that it is easy to understand the contribution made by each device in the system to the overall method. The software running on each of the digital asset storage server 1 and the end user's personal computer 5 is typically downloaded from the stream management server 4, for example when the owner of the digital assets stored on the digital asset server 1 and the end user sign up to the service provided by the operator of the stream management server 4.

A standalone process is run on the digital asset storage server 1 to import digital assets into the digital asset storage space 7. In this process, a user uploads or imports one or more source data files in step 20. In this example, the items represented by the digital assets are models for reproduction using a 3D printer. The source data files are therefore typically CAD files or STL files or similar files that can be used to represent a 3D object. The source data files are converted into digital assets, for example, in G-code or FLP format (which represents the 3D object as a number of 2D slices and contains instructions for controlling a 3D printer to reproduce each slice) in step 21 and then stored in the digital asset storage space 7. If the source data files are already in G-code format, no conversion is necessary and the uploaded or imported G-code files may be directly stored in the digital asset storage space 7.

Once the digital asset or digital assets have been stored in the digital asset storage space 7, they are published on the e-commerce server 6 in step 22. This will make the item represented by the digital asset available on a webpage for selection and purchase by an end user. In addition, various metadata relating to the item and digital asset that represents it may be made available to the stream management server 4 for storage in the stream management data base 8. These metadata may include details of the materials and the quantities of materials required to reproduce the item, for example, so that the stream management server 4 is able to verify that an end user's equipment is capable of reproducing the item.

The stream management database 8 may also store account profiles for the owner of the digital assets stored on digital asset storage server 1 and the end user. It may also store metadata relating to the end user's 3D printer (for use in verifying its capabilities as described above) and it may store statistics relating to printing by end users and their payment history as well as printing tokens issued to end users, the purpose of which will be explained later.

To reproduce an item that an end user has seen on the e-commerce website provided by e-commerce server 6, for example by browsing on the website using personal computer 5, the end user has to select the item from the website and usually pay a fee. The e-commerce server 6 handles the transaction and notifies the stream management server 4 of the transaction in step 23 which then proceeds to carry out the processing necessary to reproduce the item purchased at the end user's 3D printer 9.

In response to the confirmation of the transaction received in step 23, the stream management server generates a print token in step 24 and sends it to the end user's personal computer 5. The print token is a unique data token that is associated with the transaction and with the end user's profile in stream management data base 8. The end user's personal computer 5 receives the print token in step 25.

Once the 3D printer 9 has been initialised and is online and ready for printing, the end user's personal computer 5 sends a request to process the token in step 26 to the stream management server 4. In step 27, the stream management server 4 checks the request against the details stored in the stream management database 8. In particular, it ensures that the details of the token included in the request sent in step 26 match those of the token stored in the stream management database 8 and associated with the profile of the end user who owns personal computer 5. The issue of the token and waiting for receipt of a request relating to process the token before carrying on processing as described ensures that the end user's personal computer 5 and 3D printer 9 are available for printing before any data relating to the digital asset representing the item are transmitted from the digital asset storage server 1.

Once the details of the request received in step 27 have been verified to relate to a valid token, the stream management server 4 generates a key pair in step 28. An encryption key is sent to the digital asset storage server 1 along with a request for the next (at present, the first) segment of data from the digital asset representing the item to be reproduced. A decryption key corresponding to the encryption key is sent to the end user's personal computer 5 and received in step 29 by the personal computer 5 which stores the key securely until it is needed.

Since cryptographic keys are being distributed from the stream management server 4 to the digital asset storage server 1 and personal computer 5, the communication channels between these devices will be protected by way of a suitable communications protocol such as Transport Layer Security (TLS).

The encryption and decryption keys are unique and are only used once in respect of each segment of data from the digital asset. After use, they may be destroyed. In one embodiment, a dynamic encryption process is used such that not only are unique keys used for each segment but the encryption algorithm that is used may be changed for each segment. The encryption algorithm used for any segment may be randomly selected from a list of available algorithms or each algorithm in the list may be cyclically selected. Suitable algorithms include AES-256, Twofish, Serpent and Salsa20.

Figure 2:
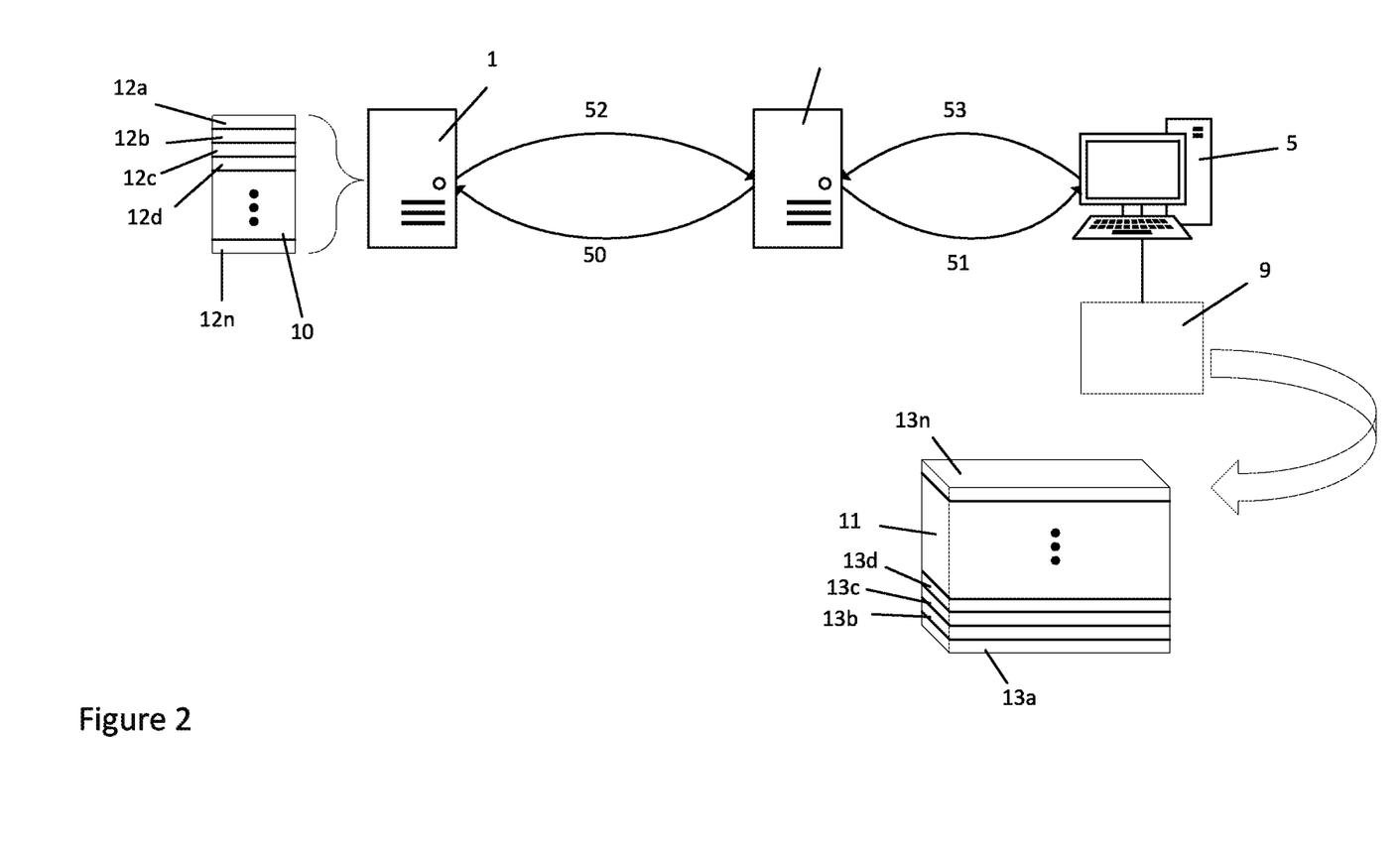
FIG. 2 shows the process involved in reproducing an item using the system of FIG. 1.

The distribution of the keys and the request for the next segment of data from the digital asset by the stream management server 4 to the digital asset server 1 and the personal computer 5 are depicted by arrows 50 and 51 in FIG. 2. In step 30, the digital asset server receives the encryption key and request. It extracts the next segment of data from the digital asset 10. A segment of obfuscation data may be provided instead of a segment of data from the digital asset 10. This obfuscation data may be extracted from a pre-populated database which is present on the digital asset storage server 1 or the stream management server 4. Alternatively, the segment of obfuscation data may be generated on the digital asset storage server 1 or the stream management server 4 in accordance with a set of rules. In FIG. 2, the digital asset 10 shows segments of data 12a, 12b, 12c, 12d ... 12n. Thus, on receipt of the first request, the digital asset storage server 1 will extract segment 12a from the digital asset 10 or, alternatively, a segment of obfuscation data will be provided by the digital asset storage server 1 or the stream management server 4. On the next request, it will extract segment 12b or, alternatively, a segment of obfuscation data will be provided as discussed previously and so on until the final segment 12n has been extracted. Additional segments of obfuscation data may be provided as discussed previously after the final segment 12n.

The size of the segments 12a-12n and the segments of obfuscation data are to a certain extent arbitrary. They may be dynamically adjusted to suit the size of the digital asset 1 and/or the bandwidth of the communications channel to the stream management server 4. Where the digital asset 10 comprises a file containing 2D data instructions, such as a G-code file, a PNG file, a SVG file or any other suitable intermediary file type for controlling a 3D printer to reproduce an item then the size of the segments 12a-12n or the segments of obfuscation data may be adjusted to correspond to one layer of the item. Thus, as shown in FIG. 2, segment 12a may comprise the instructions necessary to control the 3D printer 9 to reproduce a first layer 13a of the item 11, segment 12b may comprise the instructions necessary to control the 3D printer 9 to reproduce a second layer 13b of the item 11, and so on until the final segment 12n which may comprise the instructions necessary to control the 3D printer 9 to reproduce the final layer 13n of the item 11.

In step 31, the digital asset storage server 1 encrypts the segment extracted in step 30 with the encryption key. If dynamic encryption is being used, the encryption technique is selected as described above. The encrypted segment of data is then sent to the stream management server 4 (arrow 52 in FIG. 2). The stream management server temporarily stores the encrypted segment in a cache in step 32 and then forwards it (arrow 51 in FIG. 2) to the end user's personal computer 5. The cache may be a secure cache.

In step 33, the end user's personal computer 5 decrypts the received encrypted segment of data from the digital asset 10 using the decryption key received in step 29 and stores the result in protected memory. As will be known to those skilled in the art, protected memory is a section of memory in which the access rights are control led by the operating system to prevent a process from accessing memory that has not been allocated to it. Thus, no other processes can access the decrypted data and obtain the segment of the digital asset 10. As an additional step, a segment of obfuscated data may be generated on the end user's personal computer and stored in protected memory. This segment of obfuscated data may be extracted from a data base that is stored on the end user's personal computer 5 or generated in accordance with a set of rules. This segment of obfuscated data may be sent to the 3D printer instead of the received encrypted segment of data.

In step 34, the 3D printer is control led using the instructions in the segment of data of the digital asset 10 decrypted in step 33. If the received segment is obfuscation data, then the reproduction device will be unresponsive. In step 35, the process running on personal computer 5 verifies whether the 3D printer was successful in printing the portion of the item represented by the segment of data. If it was unsuccessful, a notification of the print error is sent in step 36 to the stream management server 4 (arrow 53 in FIG. 2). On the other hand, if it was successful, the segment of data in protected memory is destroyed in step 37 and a notification of the successful reproduction is sent to the stream management server 4 (arrow 53 in FIG. 2).

Step 38 causes the stream management server 4 to await the notification sent by the personal computer 5 in step 36 or 37. If printing was unsuccessful, then step 39 handles the print error. This step might instruct the personal computer 5 to retry processing the instructions in the segment of data of the digital asset 10 decrypted in step 33, if appropriate. Alternatively, it might send a message to the personal computer 5 instructing the end user to vacate the 3D printer of an aborted attempt to reproduce the item represented by digital asset 10 and to restart the process. If the segment of data was obfuscation data, step 39 might comprise reverting to step 28 as described below.

However, if printing was successful then step 40 checks whether notification has been received from the digital asset storage server 1 that the final segment of data from the digital asset 10 has been sent. This notification is sent in step 41 when the digital asset storage server 1 extracts the final segment 12n from the digital asset 10. If the final segment has been sent, the process ends. If it has not yet been sent, processing reverts to step 28 and new keys are generated and the next segment requested. The process then continues in the manner already described with subsequent segments of data until the final segment of data is processed and notification of this is received by the stream management server 4 from the digital asset storage server 1.

In other embodiments, firmware may be provided on the reproduction device itself, so that when the instructions are streamed from a user's device to a reproduction device, the data may be encrypted right up to the point that it is received by the reproduction device and the decryption of the data may take place on the reproduction device rather than on the user's device. This provides an additional layer of security as an adversary cannot inspect the data that is transferred between the user's device and the reproduction device.

In some embodiments, the stream management server may track each transaction or transferred data segment via unique identifiers, such as a hash or a digital watermark, and utilize a blockchain to track the transactions. This provides an advantage in that there is a secure record made of each transaction and that any breach of security (for example unauthorized sharing of a digital asset or streamed segment) can be traced back to an individual user.

By way of the system and method described above, the invention allows an end user to reproduce an item in away that prevents the end user from making an uncontrolled number of reproductions and from sharing instructions for reproducing the item with other users in an uncontrolled manner. Owners of intellectual property in digital assets can therefore enable reproduction of the items represented by the digital assets without fear that they will lose control of their intellectual property.

The invention claimed is:

1. A computer-implemented method for controlling reproduction of an item represented by a digital asset stored in a trusted computing environment using a reproduction device associated with an untrusted computing environment, in which a succession of data segments is transmitted from the trusted computing environment to the untrusted computing environment, the succession of data segments comprising segments of reproduction data, including at least one instruction for controlling the reproduction device to reproduce a portion of the item corresponding to a segment of the reproduction data, and at least one segment of obfuscation data, which has a structure identical to the reproduction data but is incapable of controlling the reproduction device to reproduce a portion of the item, the method comprising:
a) determining, at the trusted computing environment, whether a next segment of data in the succession of data segments should be a segment of reproduction data or a segment of obfuscation data;
b) when it is determined the next segment of data should be a segment of reproduction data, selecting and extracting, at the trusted computing environment, an unprocessed segment of data from the digital asset as the next segment of data;
c) when it is determined the next segment of data should be a segment of obfuscation data, obtaining, at the trusted computing environment, a segment of obfuscation data as the next segment of data;
d) generating, at the trusted computing environment, a unique encryption key and encrypting, at the trusted computing environment, the next segment of data using the unique encryption key;
e) transmitting the encrypted next segment of data from the trusted computing environment to the untrusted computing environment;
f) decrypting, upon receipt at the untrusted computing environment, the encrypted next segment of data;
g) controlling, at the untrusted computing environment, the reproduction device by,
when the next segment of data is reproduction data, instructing the reproduction device associated with the untrusted computing environment to reproduce the portion of the item in accordance with the at least one instruction included with the data segment, the at least one instruction being a computer numerical control, and
when the next segment of data is obfuscation data, instructing the reproduction device to standby; and
h) iterating steps (a) to (g) until an entirety of the digital asset, or a desired portion of the digital asset, has been processed.

2. A computer-implemented method according to claim 1, wherein the reproduction device is a three-dimensional printer.

3. A computer-implemented method according to claim 1, wherein the digital asset is a file containing two-dimensional data instructions in a computer numerical control programming language.

4. A computer-implemented method according to claim 1, wherein step (c) comprises obtaining the obfuscation data by extracting the obfuscation data from a pre-populated database.

5. A computer-implemented method according to claim 1, wherein step (c) comprises obtaining the obfuscation data by generating the obfuscation data in accordance with a set of rules.

6. A computer-implemented method according to claim 1, wherein step (g) includes verifying completion of the reproduction of the portion of the item without error by receiving, at the trusted computing environment and from the untrusted computing environment, a notification of successful reproduction.

7. A computer-implemented method according to claim 1, wherein the data decrypted in step (f) are stored in protected memory at the untrusted computing environment.

8. A computer-implemented method according to claim 7, wherein the data stored in protected memory are erased after step (g) has been completed.

9. A computer-implemented method according to claim 1, wherein step (e) comprises transmitting the encrypted segment of data from the trusted computing environment to the untrusted computing environment via an intermediate server.

10. A computer-implemented method according to claim 9, wherein the unique encryption key is generated by the intermediate server and transmitted to a digital asset storage server on which the digital asset is stored in the trusted computing environment.

11. A computer-implemented method according to claim 1, wherein the next segment of reproduction data selected in step (a) is contiguous with already-processed segments of data in the digital asset, when iterating steps (a) to (g).

12. A computer-implemented method according to claim 1, wherein the location of the segment of reproduction data selected in step (a) and the location of the next segment of reproduction data selected in step (a) within the digital asset are random, when iterating steps (a) to (g).

13. A computer-implemented method according to claim 1, further comprising translating a source data structure in a first format into the digital asset.

14. A computer-implemented method according to claim 1, wherein the method is initiated by selection and/or purchase of the item from an online source.

15. A computer-implemented method according to claim 1, wherein firmware is provided on the reproduction device, such that the data segment is decrypted at the reproduction device.

16. A computer-implemented method for reproducing an item represented by a digital asset stored in a trusted computing environment using a reproduction device associated with an untrusted computing environment, in which a succession of data segments is transmitted from the trusted computing environment to the untrusted computing environment, the succession of data segments comprising segments of reproduction data, including at least one instruction for controlling the reproduction device to reproduce a portion of the item corresponding to a segment of the reproduction data, and at least one segment of obfuscation data which has a structure identical to the reproduction data but is incapable of controlling the reproduction device to reproduce a portion of the item, the method comprising:
(a) receiving, at the untrusted computing environment and as an encrypted segment of data, either reproduction data extracted from the digital asset at the trusted computing environment or obfuscation data;
(b) decrypting, at the untrusted computing environment, the received encrypted segment of data, the decrypted encrypted segment of data being a data segment;
(c) controlling, at the untrusted computing environment, the reproduction device by,
when the data segment is reproduction data, instructing the reproduction device associated with the untrusted computing environment to reproduce the portion of the item in accordance with the at least one instruction included with the data segment, the at least one instruction being a computer numerical control, and
when the data segment is obfuscation data, instructing the reproduction device to standby; and
(d) iterating steps (a) to (c) until an entirety of the digital asset, or a desired portion of the digital asset, has been reproduced.

* * * * *